United States Patent [19]

Thulin

[11] Patent Number: 5,038,988
[45] Date of Patent: Aug. 13, 1991

[54] LOAD CARRIERS

[75] Inventor: Willis Thulin, Hillerstorp, Sweden

[73] Assignee: Industri AB Thule, Hillerstorp, Sweden

[21] Appl. No.: 375,026

[22] PCT Filed: Dec. 4, 1987

[86] PCT No.: PCT/SE87/00580
§ 371 Date: Jun. 19, 1989
§ 102(e) Date: Jun. 19, 1989

[87] PCT Pub. No.: WO88/04620
PCT Pub. Date: Jun. 30, 1988

[30] Foreign Application Priority Data

Dec. 22, 1986 [SE] Sweden .................. 8605527

[51] Int. Cl.⁵ ............................. B60R 9/00
[52] U.S. Cl. ............................. 224/322; 224/329
[58] Field of Search ............... 224/329, 330, 331, 326, 224/325, 321, 315, 309, 314, 322

[56] References Cited

U.S. PATENT DOCUMENTS

| 4,586,638 | 5/1986 | Prescott et al. | 224/329 |
| 4,688,706 | 8/1987 | Thulin | 224/329 |

FOREIGN PATENT DOCUMENTS

| 376936 | 1/1985 | Austria . | |
| 3605479 | 9/1986 | Fed. Rep. of Germany . | |
| 3626926 | 2/1988 | Fed. Rep. of Germany | 224/315 |
| 3709335 | 10/1988 | Fed. Rep. of Germany | 224/326 |
| 8403766-2 | 7/1984 | Sweden . | |
| 440339 | 7/1985 | Sweden . | |

OTHER PUBLICATIONS

PCT/SE87/00580-"Patent Cooperation Treaty International Preliminary Examination Report".

Primary Examiner—Linda J. Sholl
Attorney, Agent, or Firm—Burns, Doane, Swecker & Mathis

[57] ABSTRACT

A load carrier for a vehicle roof is provided with a load carrying strut (2) with a foot arrangement (1) in each end. At least one foot arrangement (1) is provided with an accommodation space (6) in which an end portion of the strut may be inserted. According to the invention, the accommodation space (6) is in downward communication with a cuneiform locking space (7) in which a locking body (9) is placed. The locking space (7) is defined downwardly by a cam surface (8) which is obliquely inclined in relation to the longitudinal direction of the strut (2), and the locking body (9) is actuated by a screw (10) so as to be movable along the cam surface (8) and thereby to a position fixedly clamping the strut (2) in its accommodation space (6). A flexible sheet spring (14) may be disposed between the locking body (9) and the strut for protecting the surface coating of the strut (2).

5 Claims, 2 Drawing Sheets

LOAD CARRIERS

TECHNICAL FIELD

The present invention relates to an apparatus in such a type of load carrier for mounting on a vehicle roof as is provided with a load carrying device extending over the vehicle roof, the device being anchored to the edge portions of the vehicle roof by means of foot arrangements, at least one of the foot arrangements being provided with a space for accommodating a portion of the load carrying device.

BACKGROUND ART

This Art abounds in different types of foot support arrangements which are employed for anchoring, for example, roof racks, load carriers, ski boxes and the like to the roof of a vehicle. These support arrangements may either be designed in such a manner as to cooperate with a gutter along the edge of the vehicle roof, or in such a manner that they support against the roof proper and engage with an edge portion of the roof, for example at a door opening. These prior Art support arrangements have also been provided with connection devices of different designs for interconnecting the foot arrangements to the strut which, as a rule, extends transversely over the vehicle roof to a corresponding foot arrangement on the opposing edge portion of the roof.

In certain cases, these prior Art constructions have functioned not unsatisfactorily, but have often been complex in both their manufacture and manner of employment. Furthermore, in certain prior Art constructions, there has also been the risk that the connection between the foot and the strut extending over the vehicle roof has been shaken loose under the action of vibrations, which is wholly unnaceptable in those cases where the foot arrangements have been used on a vehicle which lacks a gutter extending along the edge of the vehicle roof. The reason why these problems have been particularly manifest in this latter type of vehicle is quite simply that, in such cases, the strut extending over the roof has been exposed to tractive forces, since the foot arrangements are tensioned obliquely inwardly towards the centre line of the vehicle roof. Hence, this tensioning force must be transferred via the strut in order that the entire load carrier be safely and securely retained on the vehicle.

PROBLEM STRUCTURE

The present invention has for its object to realise an apparatus of the type disclosed by way of introduction, the apparatus being designed in such a manner that it is simple and economical to manufacture, and that it offers an absolutely reliable interconnection between the foot arrangement and the load carrying strut extending over the roof of the vehicle. The present invention further has for its object to realise an apparatus which, in certain embodiments, permits the direct retraction, into the foot arrangement proper, of the strut which extends over the vehicle roof. In a further embodiment, the present invention also has for its object to realise an apparatus which affords completely reliable locking of the load carrying strut extending over the vehicle roof, without damaging the protective coating on the strut. Finally, the present invention further has for its object to realise an apparatus which permits an adjustment of the position of the load carrying strut in relation to the foot arrangement and, of course, also rapid and simple dismounting and mounting of the load carrying strut in the foot arrangement.

SOLUTION

The objects forming the basis of the present invention will be attained by means of an apparatus intimated by way of introduction which is characterised in that the accommodation space is in communication with a locking space provided in the foot arrangement, the defining wall of the locking space facing away from the load carrying device being designed as a cam or ramp surface which is obliquely inclined in relation to the longitudinal direction of the load carrying device; and that a locking body is disposed in the locking space, the locking body being movable, by means of operating members, along the cam or ramp surface for fixedly clamping the load carrying device in the space.

One preferred embodiment of the apparatus according to the present invention is suitably characterised in that the cam or ramp surface is oriented so that its one end portion facing away from a central region of the load carrying device is located more proximal the load carrying device than its end portion facing towards the central region of the load carrying device.

As a result of these constructional features, it will be possible to realise a tractive force between the foot arrangement and the load carrying device, such that the load carrying device is retracted into the space in the foot arrangement.

The present invention is further suitably characterised in that the cam or ramp surface is disposed beneath the load carrying device when the load carrier proper is mounted on the vehicle roof.

These dispositional features entail that the subject matter of the present invention may be rendered extremely compact and efficient in its construction.

A further embodiment of the apparatus according to the present invention is characterised in that the foot arrangement is provided with a channel which discharges in the cam or ramp surface; that a screw extends through the channel and enters into threaded engagement with the locking body, the channel being of greater transverse dimension than the screw in order to permit displacement of the screw transversely of its longitudinal direction.

Yet a further embodiment of the apparatus according to the present invention is suitably characterised in that the foot arrangement is provided, in that side of the locking space facing in a direction towards a central region of the load carrying device, with a threaded portion through which a screw is passed with threading engagement; and that the screw extends into contact with the locking body in order to manoeuvre the locking body along the cam or ramp surface.

Further advantages will be attained if the subject matter of the present invention is also given one or more of the novel constructional features as disclosed hereinbelow.

BRIEF DESCRIPTION OF THE ACCOMPANYING DRAWINGS

The nature of the present invention and its aspects will be more readily understood from the following brief description of the accompanying Drawings, and discussion relating thereto.

In the accompanying Drawings:

FIG. 1 shows, in partial cross-section, a part of the load carrier according to the present invention, seen in the longitudinal direction of the vehicle; and FIG. 2 is a view corresponding to that of FIG. 1, showing a modified embodiment of the apparatus according to the present invention.

DESCRIPTION OF PREFERRED EMBODIMENT

Figure 1:
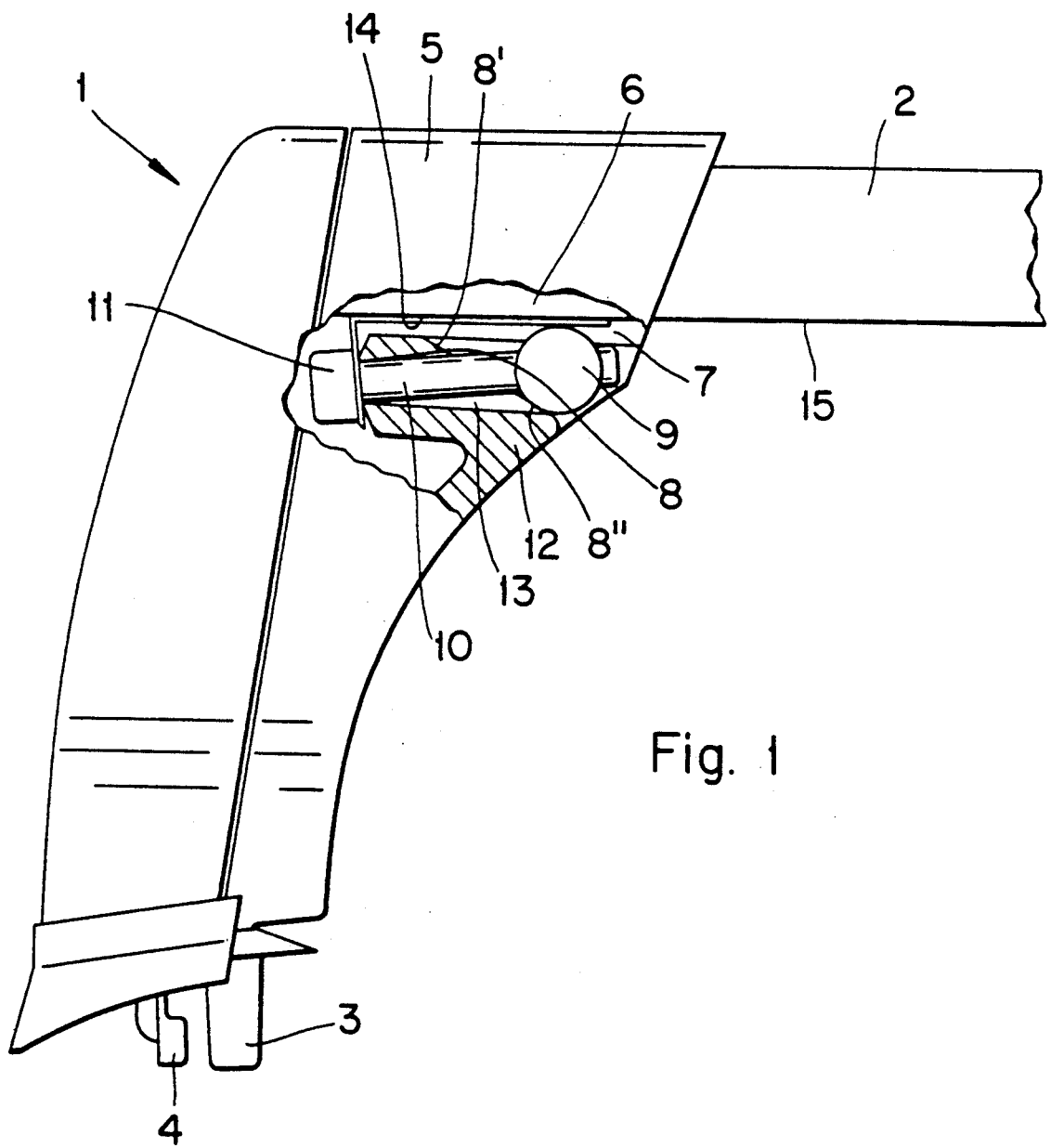

Referring to the Drawings, FIG. 1 shows, in partial cross-section, a foot arrangement 1 and a strut 2 anchored therein, the strut being intended to carry a load above a vehicle roof and extending over the roof. At the opposite end of the strut, a second foot arrangement is provided, which may be designed in the same manner as that illustrated in FIG. 1, but which, of course, may be of other construction.

In the embodiment shown on the Drawing, the foot arrangement 1 is provided, at its lower end, with engagement members 3 and 4 for fixedly anchoring the foot proper to a vehicle roof at the longitudinal edges thereof. In the illustrated embodiment, the engagement members 3 and 4 are constructed such that they are intended to engage with a mounting rail which is recessed in the vehicle roof along its edges. As an alternative to this design of the engagement members, the foot arrangement may, of course, be of such construction as to be intended for anchorage in a conventional roof gutter along the edge of the vehicle roof. Correspondingly, the foot arrangement may also be of such construction that it may be fixedly retained on a vehicle roof which is neither provided with a gutter nor with the above-indicated mounting rail. In this alternative embodiment, the foot arrangement is provided with a support plate which abuts against the vehicle roof (corresponding to the engagement member 3) and a catch (corresponding to the engagement member 4) which grasps about an edge portion of the vehicle roof, appropriately at a door opening.

According to the present invention, the foot arrangement is provided, in its upper end, with an accommodation portion 5 which is interiorly provided with an accommodation space for an end portion of the strut 2. This accommodation space is intimated on the Drawing by reference numeral 6. The inner configuration of the accommodation space may be such that the strut 2 is readily insertible therein, and, to this end, the accommodation portion 5 may be in the form of a sleeve whose interior constitutes the accommodation space 6.

The foot arrangement 1 is further provided, beneath the accommodation space 6, with a cuneiform locking space 7 whose defining wall facing away from the strut 2 is designed as an obliquely inclined ramp or cam surface 8 which slopes in relation to the longitudinal direction of the strut 2 such that the end 8' of the cam surface 8 which is longitudinally further from the central region of the strut is located transversely closer to the strut than is the end 8" of the cam surface 8 which is longitudinally closer to the central region of the strut. Hereby, a cuneiform configuration will be imparted to the locking space 7, in which instance the locking space 7 may be considered as being upwardly defined, at least in part, by the strut, i.e. towards the strut 2 proper. Hence, there is an aperture and passage between the locking space 7 and the accommodation space 6 for the strut.

It was mentioned above that the cam or ramp surface 8 was to incline in relation to the longitudinal direction of the strut 2, such that its left-hand end in the Drawing is located more proximal the strut than its right-hand end in the Drawing. Naturally, the ramp surface may also incline in the opposite direction, in which event further constructional modifications will be required. Irrespective of the direction in which the cam or ramp surface inclines, its angle of inclination in relation to the longitudinal direction of the strut 2 should be acute and may lie in the range of between 20° and 60°.

According to the invention, a locking body 9 is disposed in the locking space 7, this body being, in the embodiment according to FIG. 1, in the form of a short cylindrical piece which is of such diameter that it may be in contact with both the cam or ramp surface 8 and the underside of the strut 2. The locking body 9 is provided with a threaded through-bore at right angles in relation to its centre axis, a screw 10 threadingly engaging in the bore. The screw 10 may be considered as a tightening device or manoeuvering device for displacing the locking body along the cam or ramp surface 8 for fixedly clamping the strut 2 in the accommodation space 6. In the illustrated embodiment, the screw 10 has a head 11 which abuts against a fixed portion 12 of the foot arrangement, and the cam or ramp surface 8 is also disposed on this fixed portion. A channel or ball 13 is provided through the fixed portion 12, through which channel the screw 10 extends, the channel being of larger transverse dimension than the screw, such that the screw is movable transversely of its longitudinal direction in order to allow the locking body 9 to be displaced along the cam or ramp surface 8. As is apparent from FIG. 1, the channel 13 may be approximately conical or cuneiform, but it may also be of uniform thickness. In such an instance, some form of washer should suitably be placed between the fixed portion 12 and the head 11, the washer being designed to permit the screw 10 to rock in the channel. It will further be apparent from the Drawing that the channel 13 discharges in the cam or ramp surface 8, preferably in the central region thereof, seen in a direction at right angles to the plane of the Drawing, so that the locking body 9 may thereby be symmetrically placed with one portion on either side of the longitudinal axis of the channel 13.

In the illustrated embodiment, a flexible portion 14, for example a sheet spring or the like, is disposed between the locking space 7 and the accommodation space 6, the spring being movable towards and away from the strut 2 in the communication area which is formed between the accommodation space and the locking space. The purpose of the sheet spring 14 is to prevent excessively concentrated loadings on the surface coating—often a plastic coating—with which the strut 2 is commonly provided. In the illustrated embodiment, the sheet spring 14 is of angular configuration and is anchored in relation to the fixed portion 12 of the foot arrangement 1 by being clamped between the screw head 11 and the fixed portion 12. Naturally, the sheet spring may also be permanently fixed by other means in the foot arrangement.

Anchorage of a strut 2 in the foot arrangement according to FIG. 1 will be enabled merely by ensuring that the screw 10 is withdrawn from the locking body 9 a sufficient distance to allow the locking body to fall, along the cam or ramp surface 8, so far as not to extend into the accommodation space 6 proper or to urge the sheet spring 14 up into this space. In this state, the strut or tube 2 may be quite simply inserted into the accommodation space 6, whereafter the screw 10 is tightened such that the locking body 9 begins, in this instance, to slide up along the cam or ramp surface 8 into abutment against the underside of the strut 2, or to urge the sheet spring 14 in an upward direction against the underside of the strut. On tightening of the screw 10, any optional clamping force may then be obtained against the portion of the strut 2 located in the accommodation space 6, such that the strut and the foot arrangement are securely and reliably interconnected.

If extra large clamping forces are desired, this simply entails that the cam or ramp surface is given a more acute angle of inclination in relation to the longitudinal axis of the strut 2 than that shown on the Drawing, in which event the increased clamping force is achieved at the cost of a longer distance of travel for the locking body 9, i.e. the screw 10 and the cam or ramp surface 8 must be made correspondingly longer. Naturally, the reverse also applies that if the angle between the cam or ramp surface 8 and the longitudinal axis of the strut is increased, a shorter screw and shorter cam or ramp surface may be employed, in which case any notion of an extreme clamping force must be discounted.

DESCRIPTION OF ALTERNATIVE EMBODIMENTS

Figure 2:
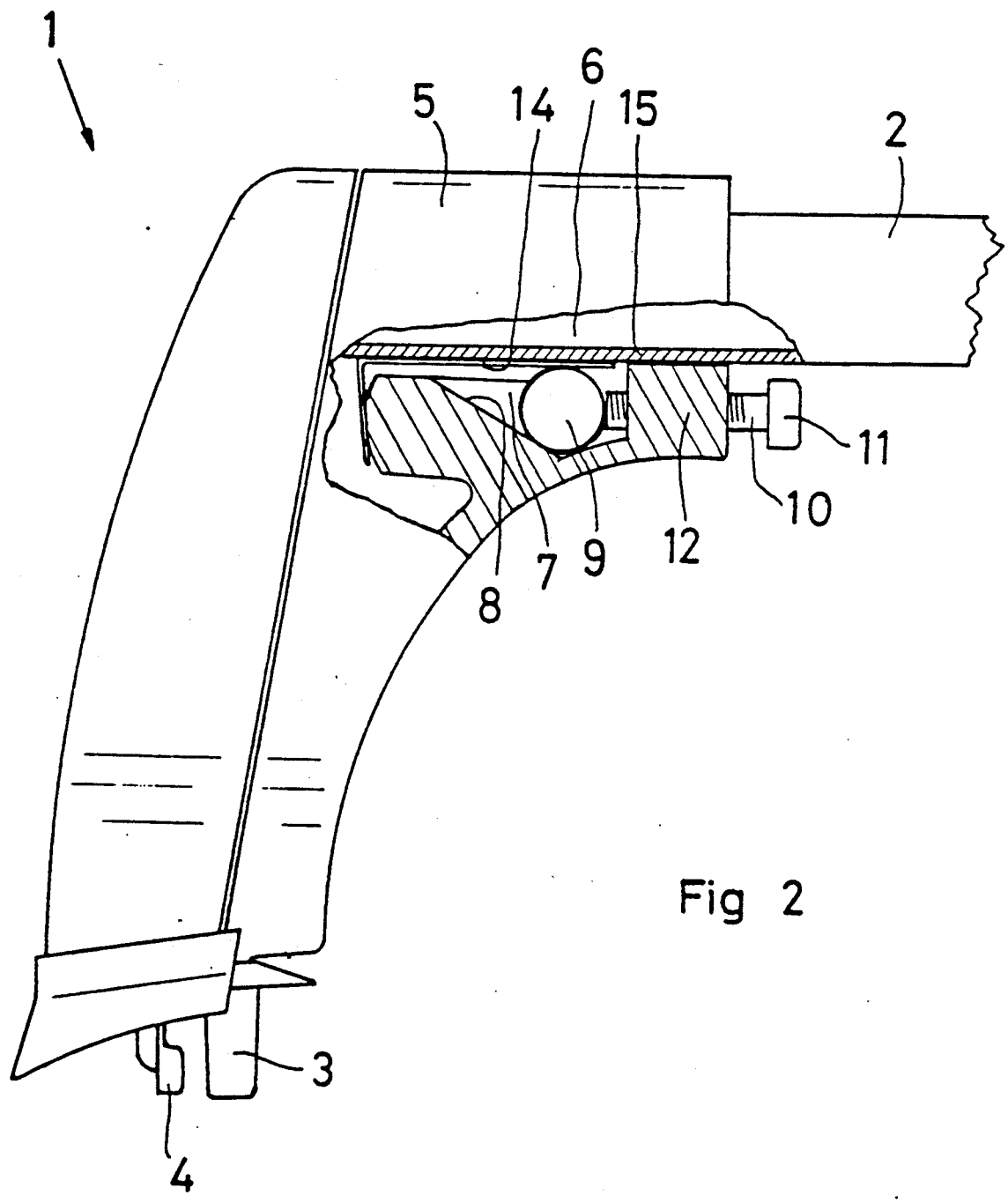

FIG. 2 shows a modified embodiment of the foot arrangement. In FIG. 2, the same reference numerals have been employed as in FIG. 1 for identical or corresponding details. The fundamental difference between the embodiments according to FIG. 1 and FIG. 2 primarily resides in the fact that the fixed portion 12 of the foot arrangement 1 has been augmented so as to extend also on the other side of the locking body 9, i.e. in a direction inside the locking body in towards the central region of the strut 2. In this instance, the fixed portion 12 is provided with a threaded through-aperture in which the screw 10 is inserted in such a manner that the screw comes into contact with the locking body 9 and may displace the locking body up along the cam or ramp surface 8 for fixedly clamping the strut 2 in the accommodation space 6. This Drawing Figure also shows the lower defining wall 15 of the strut partly in cross-section, and also the flexible sheet spring 14.

In FIG. 2, the longitudinal axis of the screw 10 is approximately parallel to the longitudinal axis of the strut 2, but this is not a critical requirement according to the present invention. The matter of critical importance is that the locking body 9 must be movable under the action of the screw up along the cam or ramp surface 8. In order to make for greater ease of accessibility of the screw head 11, the embodiment illustrated in FIG. 2 may, therefore, possibly be modified in such a manner that the screw 10 is obliquely inclined in relation to the longitudinal axis of the strut 2, for example approximately into a parallel state with the cam or ramp surface.

The flexible spring 14, as shown on the Drawings, may also be used in the embodiment of FIG. 2, but could equally be dispensed with if the strut 2 is not provided with a delicate surface coating.

In the above-described embodiments of the present invention, it has been assumed that the locking body 9 be in the form of a short, cylindrical body. Naturally, this is not critically necessary, the locking body could, instead, just as well be in the form of a ball, in which event the cam or ramp surface 8 is of corresponding race or channel configuration which adapts to the acceptation of the ball.

As a further alternative to the design of the locking body 9, it is conceivable that this may be in the form of a three-sided block - viewed from its end - in which one upper surface may be approximately planar and abut against the underside of the lower wall 15 of the strut 2. Hereby, considerable abutment surface will be achieved against the strut 2, and the flexible portion 14 may be dispensed with. The underside of such a block may suitably abut against the cam or ramp surfcace 8, while its third defining side should suitably be at approximately a right angle to the longitudinal axis of the screw 10. Such a cross-sectional three sided locking body may, naturally, also be employed in the embodiment according to FIG. 1, but, in such instance, the upper face of the locking body should be slightly arched so as to avoid linear loading or point loading against the strut 2 when the locking body turns together with the screw 10 when this rocks in the channel 13 on tightening.

In certain cases, it may be appropriate, or preferable, to design the locking body 9 such that it is provided with a frictional or engagement-promoting agent which, thus, cooperates directly with the strut 2 in order to transmit to the strut a force which strives to urge the strut into the accommodation space 6 when the locking body 9 is manoeuvred or tightened. For example, such a frictional agent may be the provision of grooving on the upper surface of the locking body, or that surface intended for cooperation with the strut.

In the foregoing, it has been assumed that the tightening device should be a screw 10 with a head which, in one manner or another, moves a locking device or body 9 into a locking position. Naturally, it would be equally effective to provide the locking device 9 with a threaded, permanently fixed shaft which cooperates with a nut for realizing this locking feature. In the embodiment according to FIG. 1, this would entail that the screw and the locking device were designed as a T-shaped member in which the longer shank extends through the channel 13 and is provided with a nut at the same position as the head 11.

The screw 10 has been described above as a tightening or manoeuvering device but, as an alternative to such a screw, use could be made of a spring which positively urges the locking body 9 towards the locking position. In order, in this embodiment, to release the locking body, use may be made of a screw other positively acting mechanism which, against the action of the locking spring, urges the locking body to that position where it releases engagement with the spring 14 or the strut 2.

Naturally, it is also possible, in the embodiment according to FIG. 2, to dispose, in the locking space 7, a weaker spring which holds the locking body 9 in a position against the end of the screw and which, hence, must be compressed when the screw is tightened for fixedly clamping the locking body against the strut 2. Such a spring disposed in the locking space 7 will positionally fix and retain the locking body 9 so that this runs no risk of unintentional displacement and loss if the flexible sheet spring 14 is dispensed with.

The embodiment according to FIG. 2 may also be modified in such a manner that the cam or ramp surface 8 need not be of the marked inclination as shown on the Drawing, but instead rather functions as a support surface for the locking body 9, this support surface preventing the locking body from displacement in a downward direction away from the lower wall 15 of the strut 2. In this embodiment, the locking body 9 is not cylindrical, being instead shaped in such a manner that, on screw actuation, it will rotate about an axis which is at right angles to the plane of the Drawing in FIG. 2, such a rotation having as a consequence that the effective height of the locking body 9 will be increased so that it will, as a result of the rotation, lift the spring 14 or also clamp directly against the underside of the strut 2.

Of course, such designs of the locking body are also conceivable in which there will be attained a combination of rolling and shifting along the cam or ramp surface, in which event the clamping force will be realised as the composite effect of both the displacement of the locking body and its rotation.

The present invention should not be considered as restricted to that described above and shown on the Drawings, many modifications being conceivable without departing from the spirit and scope of the appended Claims.

What is claimed is:

1. A load-carrying apparatus for mounting on a vehicle roof, comprising:
   a plurality of foot arrangements;
   a load carrying device having end portions and a central region between said end portions, said load carrying device extending over the vehicle roof and being fixedly retained at edge portions of the vehicle roof by means of said foot arrangements, at least one of said foot arrangements being provided with an accommodating space for accommodating one of said end portions of said load carrying device, said accommodating space being in communication with a locking space disposed in said one foot arrangement, said locking space including a cam surface facing said load carrying device which is obliquely inclined relative to the longitudinal direction of said load carrying device; and
   a locking body which is movable by operating means along said cam surface for fixedly clamping said end portion of said load carrying device in said one accommodating space during a clamping operation,
   wherein said cam surface is oriented such that an end portion of said cam surface which is located longitudinally farther from said central region of said load carrying device is located transversely closer to said end portion of said load carrying device than an end portion of said cam surface which is located longitudinally closer to said central region of said load carrying device, such that said locking body moves longitudinally away from said central region of said load carrying device during said clamping operation,
   wherein said foot arrangement is provided with a hole which extends through said cam surface, and wherein a fastener extends through said hole and is secured to said locking body, said hole having a larger transverse dimension than said fastener so as to permit displacement of said fastener transversely of its longitudinal direction.

2. The apparatus as claimed in claim 1, wherein said cam surface is located beneath said load carrying device when said load carrier apparatus is mounted on a vehicle roof.

3. The apparatus as claimed in claim 1, wherein said foot arrangement is, on that side of said locking space which is longitudinally closer to said central region of said load carrying device, provided with a threaded portion to which a screw is threadedly engaged, said screw extending into contact with said locking body so as to maneuver said locking body along said cam surface.

4. The apparatus as claimed in claim 1, wherein a flexible portion is disposed between the load carrying device and the locking body so that it may be urged against said end portion of said load carrying device under the action of said locking body.

5. The apparatus as claimed in claim 1, wherein said locking body has a surface facing said load carrying device, said surface including a frictional or engagement-promoting agent, whereby said locking body is, on contact with said load carrying device and on movement along said cam surface, operative to urge said load carrying device in a direction into said accommodating space.

* * * * *